Figures 1, 2:
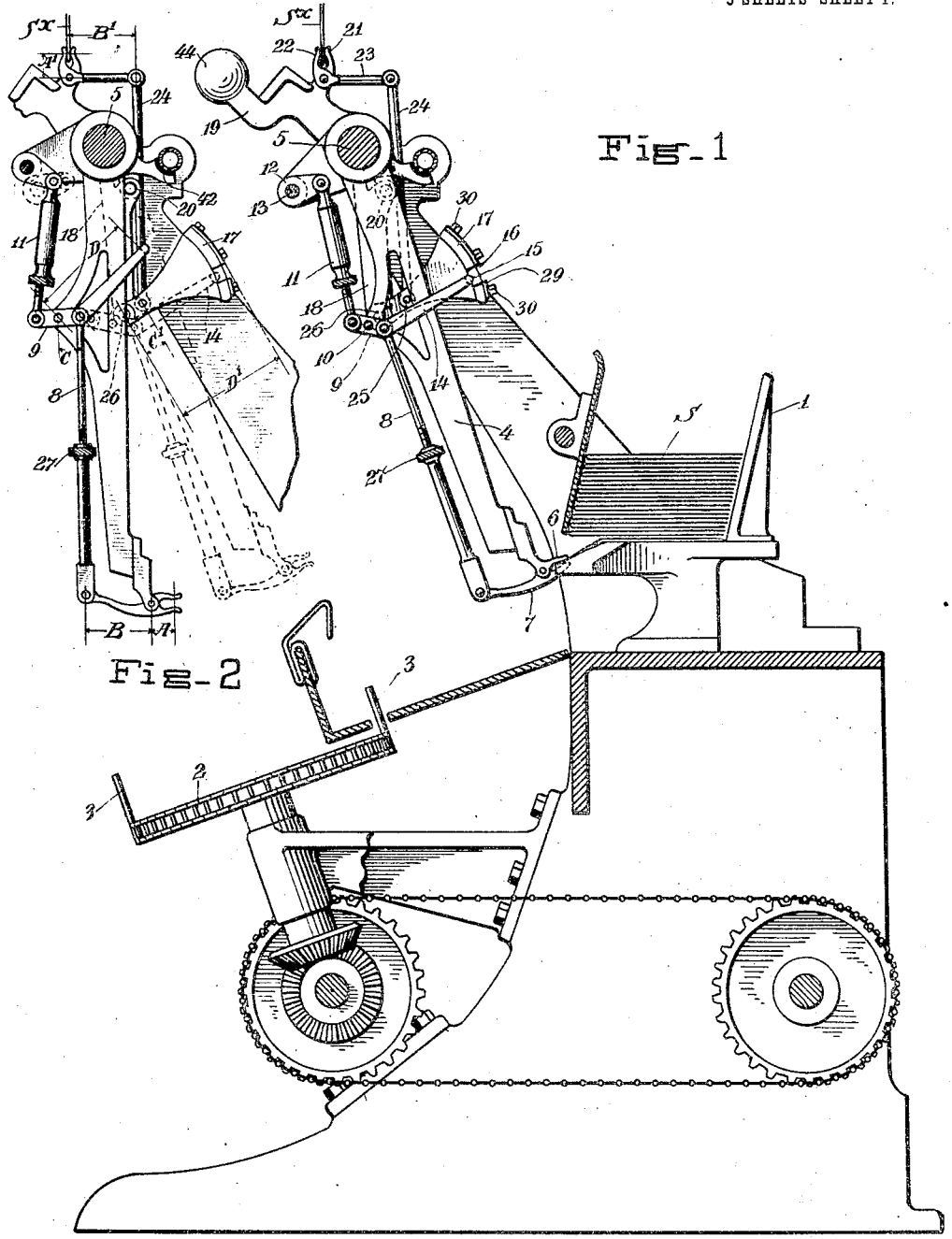

C. A. JUENGST.
SIGNATURE GATHERING MACHINE.
APPLICATION FILED MAR. 1, 1909.

1,049,492.

Patented Jan. 7, 1913.
5 SHEETS—SHEET 1.

WITNESSES

INVENTOR
Charles A. Juengst.
BY
ATTORNEYS

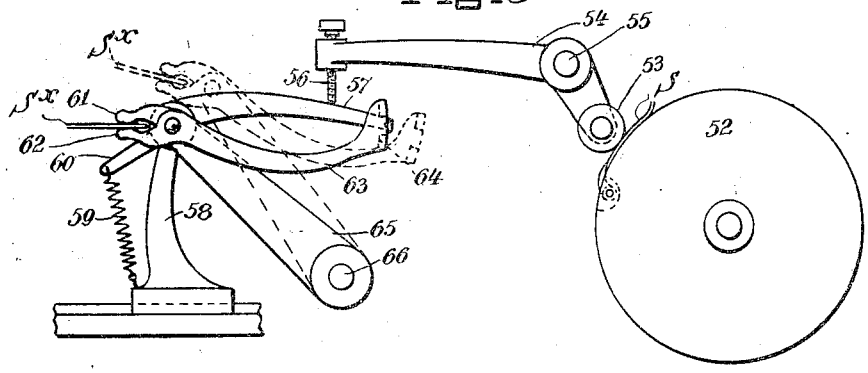
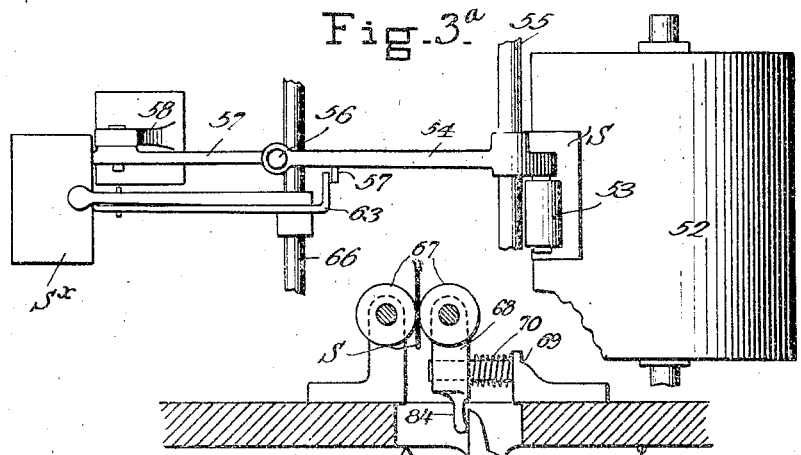
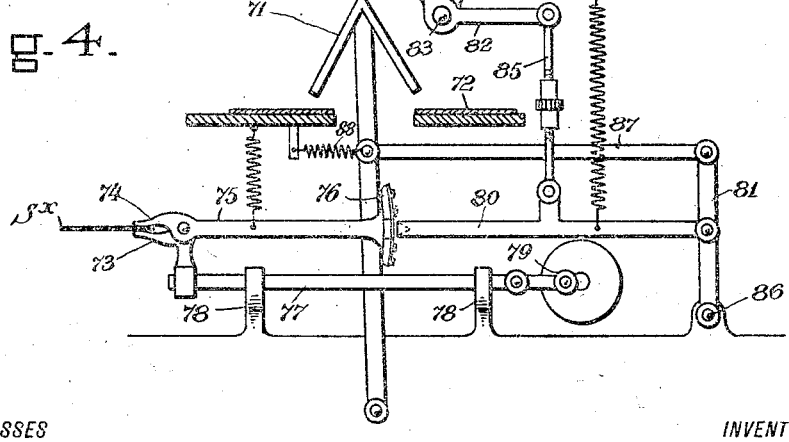

C. A. JUENGST.
SIGNATURE GATHERING MACHINE.
APPLICATION FILED MAR. 1, 1909.
1,049,492.
Patented Jan. 7, 1913.
5 SHEETS—SHEET 3.
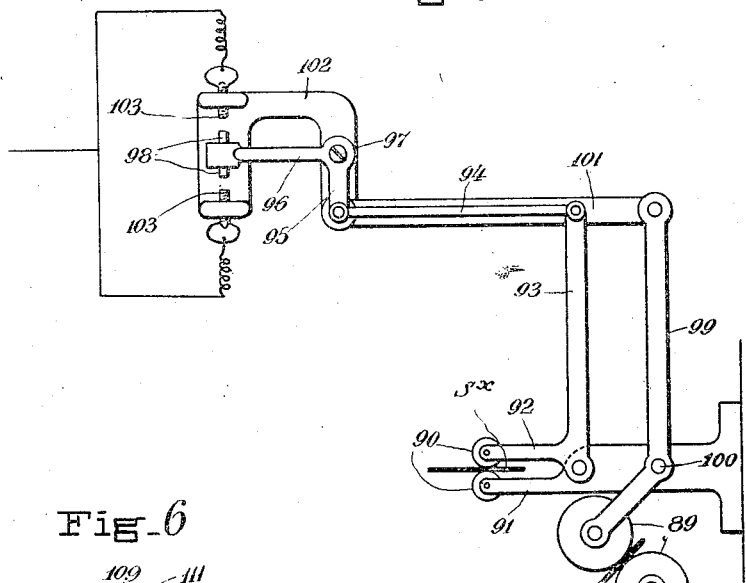
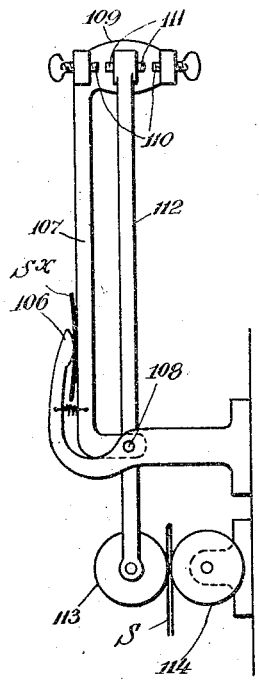
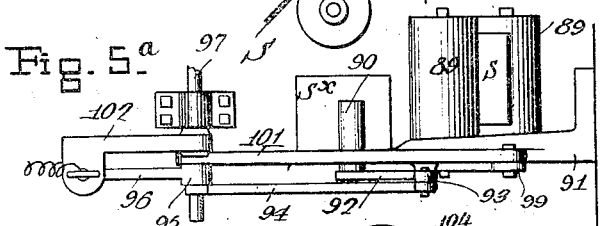
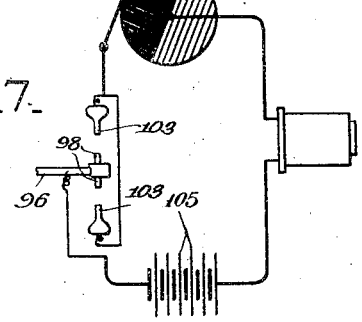
WITNESSES
INVENTOR
Charles A. Juengst.
BY
ATTORNEYS

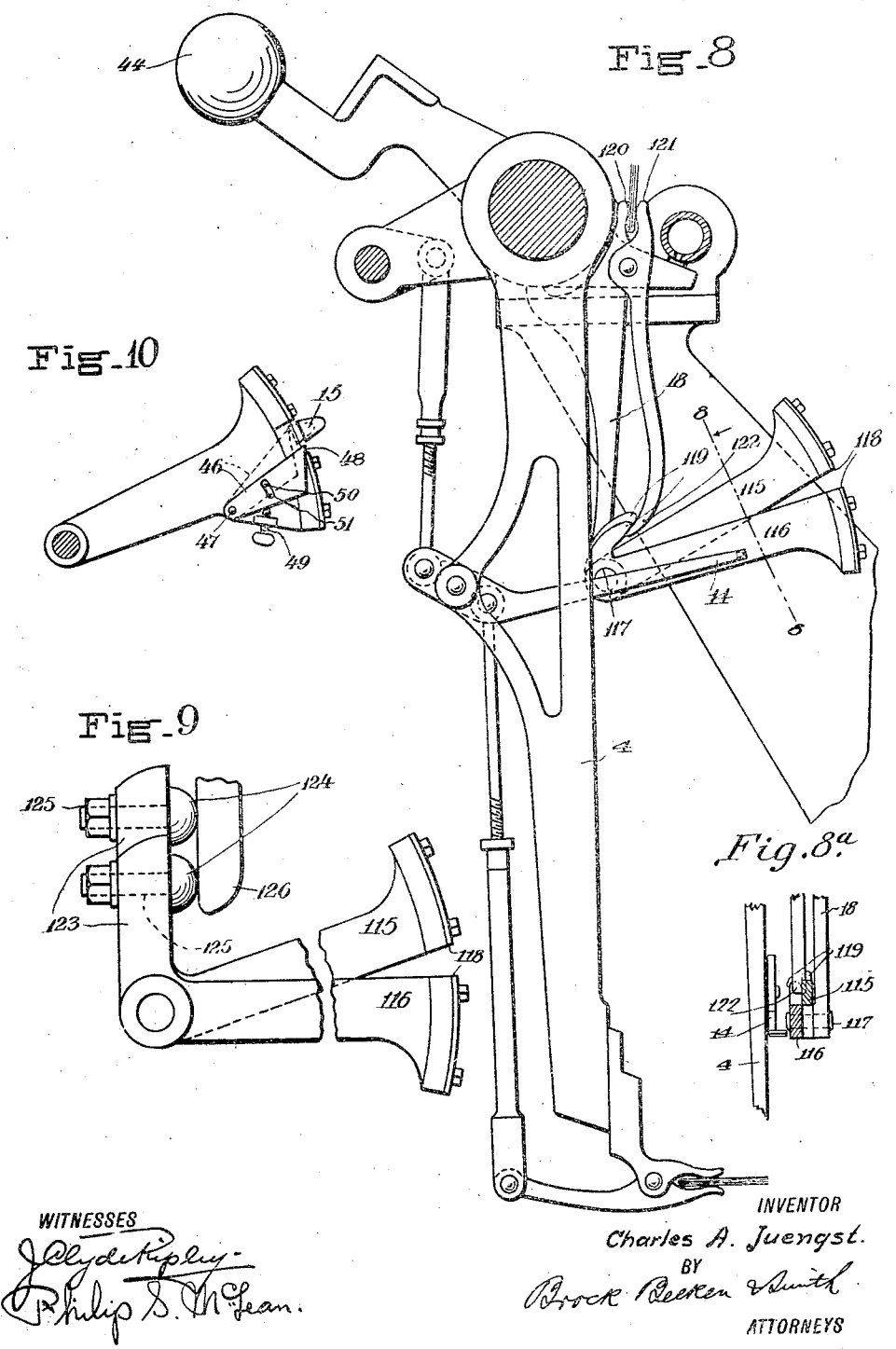

C. A. JUENGST.
SIGNATURE GATHERING MACHINE.
APPLICATION FILED MAR. 1, 1909.
1,049,492.
Patented Jan. 7, 1913.
5 SHEETS—SHEET 5.
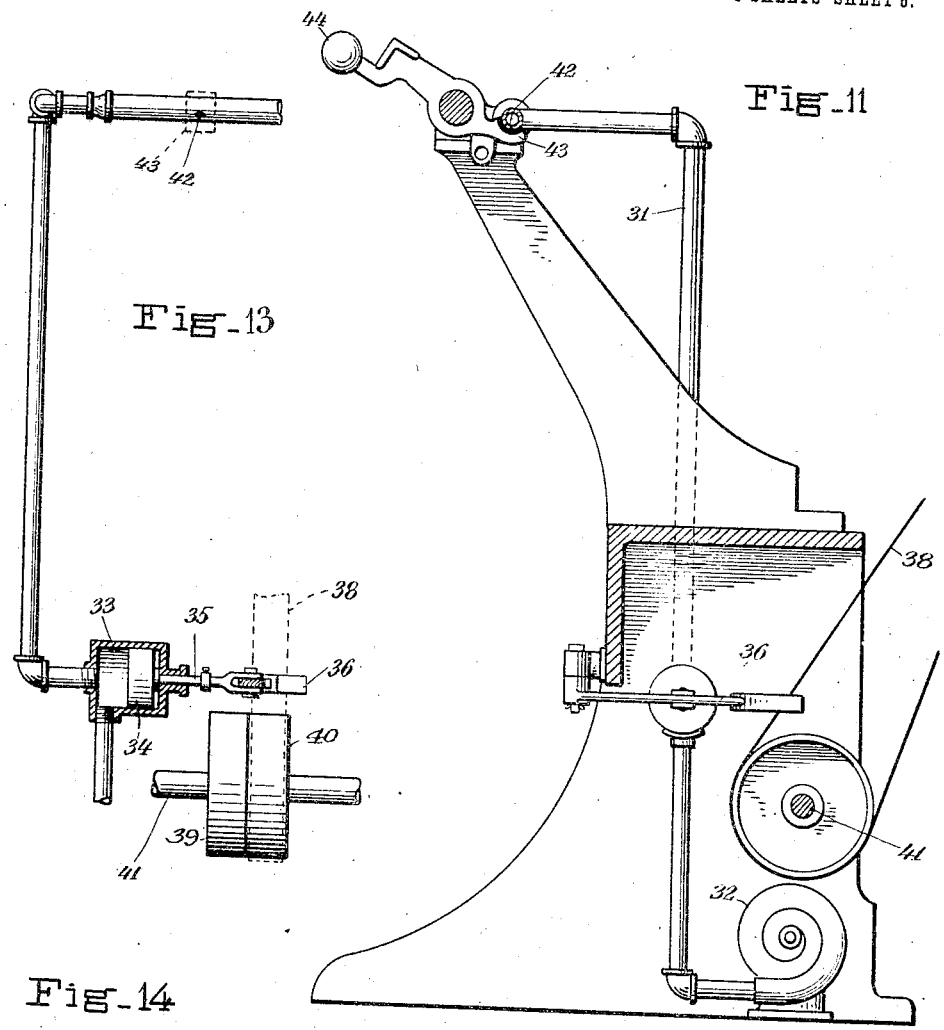
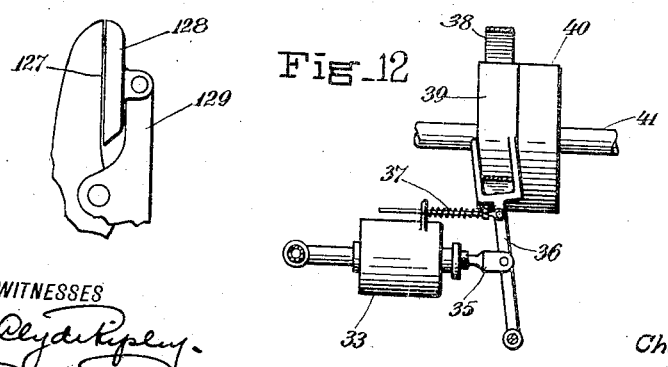
WITNESSES
INVENTOR
Charles A. Juengst.
BY
ATTORNEYS

UNITED STATES PATENT OFFICE.

CHARLES A. JUENGST, OF CROTON FALLS, NEW YORK.

SIGNATURE-GATHERING MACHINE.

1,049,492.   Specification of Letters Patent.   Patented Jan. 7, 1913.

Application filed March 1, 1909. Serial No. 480,591.

*To all whom it may concern:*

Be it known that I, CHARLES A. JUENGST, a citizen of the United States, and a resident of Croton Falls, in the county of Westchester and State of New York, have invented certain new and useful Improvements in Signature-Gathering Machines, of which the following is a specification.

My present invention relates to improvements in signature gathering machines, and more particularly to the means for detecting variations in the thickness of the signatures handled by the machine, or certain other abnormal conditions in the operation of the machine—and also to the stop mechanism for interrupting the operation of the machine when any abnormal conditions occur.

One object of the invention is to increase the efficiency of the detector mechanism, by rendering it more sensitive and more positive in its operation.

Another object of the invention is to simplify and improve the stop mechanism.

In signature gathering machines the conditions under which the machine must operate vary quite frequently and the same machine is called upon at different times to handle signatures which are of a different thickness. For this reason a signature gathering machine, to be practical, must be capable of adjustment to meet these varying conditions. Heretofore this adjustment has been accomplished by hand, that is, by means of set screws and similar hand-operated devices.

It is one of the objects of my invention to accomplish this adjustment of the machine for signatures of different thicknesses, automatically.

As is well known in the art, a signature gathering machine consists primarily of a number of boxes or hoppers which receive each a stack of signatures, a traveling apron or conveyer and a delivery device, usually in the shape of signature grippers, for conveying the signatures from the hoppers and depositing them upon the conveyer. Also there is associated with each gripper or delivery device certain mechanism for detecting any imperfect signatures handled by the gripper, or for detecting other abnormal condition in the operation of the machine, so that in case the gripper should take two signatures, or should fail to take any signature, or if the signature should be either too thick or too thin, the detector device will detect this abnormal condition and act upon certain parts to stop the machine, or to otherwise give warning of the existence of such abnormal conditions. The signatures handled by the machine vary in thickness, for instance, the signatures for one run of the machine may be all of eight page thickness, while for another job the signatures handled by the machine may be only of two page thickness. In some cases, too, the signatures contained in the different hoppers of the machine will be different in thickness. As the detector mechanism is designed to detect any variation from a predetermined thickness of signature, it will be evident, from what has been said, that this detector mechanism must be capable of such adjustment as to adapt it to these varying conditions. This detector mechanism usually consists of a member having a gate opening therein, and known as a "gate member" and a trip member or "detector finger," as it is commonly called, which is positioned according to the thickness of the material in the gripper jaws so as to pass through the opening in the gate member when the signature in the gripper jaws is of the proper predetermined thickness. The adjustment of the detector mechanism to adapt the machine for handling different thicknesses of signatures is usually made by adjusting the detector finger with relation to the gate member, or the gate member with relation to the detector finger, or in fact by adjusting either or both of the members. For the purpose of this adjustment, the gate member has usually been made in two parts, which are adjustable with relation to each other, and usually an adjustable connection has been interposed between the gripper jaws and the detector finger, so that either one or both the detector finger and gate member may be adjusted when changing from one size of signature to another size. The detector mechanism of each gripper has to be adjusted according to the thickness of the signatures contained in the hopper of that gripper. As a signature gathering machine has anywhere from ten to forty and even more hoppers and correlated grippers and detector mechanisms, it will be evident that the adjustment of such a machine to signatures of different thicknesses takes considerable time, and a great deal of care must be exercised in adjusting the detector mechanisms, in order that such mechanisms will detect even the slightest variation in the thickness of the signatures. Great accuracy is necessary to this adjustment, and in order to get the proper adjustment the parts of the detector mechanism usually have to be adjusted and re-adjusted by hand until the parts operate truly to detect any variation from the predetermined thickness. The necessity for this delicate hand adjustment has always been an objectionable feature, since a great deal of time is necessarily wasted in obtaining the proper adjustment.

With my improved machine, according to the present invention, the detector mechanism is adjusted automatically to signatures of different thicknesses, and the former necessity for hand adjustment is entirely obviated.

In its preferred form, this improved detector mechanism consists of a signature delivery device in the form of gripper jaws, rolls, or similar means, capacitated to measure the thickness of the signatures in the grip of the delivery device, a detector finger or trip member which is connected to the delivery device so as to be positioned thereby, a gate member having an opening for the passage of the trip member therethrough, and a gage device which is adapted to receive a signature of the desired thickness, and which is connected to the gate member so that when the signature in the delivery device is of the same size as that in the gage device, the two parts of the detector mechanism will be properly positioned with respect to each other and will remain inoperative. The connections between these parts are so proportioned that when the signature of the size which it is desired to be handled by the delivery device is placed in the gage device, the gate member is deflected or moved a distance proportionate to the thickness of the signature in the gage device, and the detector finger or trip member is moved or deflected in the same proportion a distance according to the thickness of the material in the delivery device. (The relation of these parts could be reversed; that is, the trip member could be positioned by the gage device and the gate member might be positioned by the gripper or delivery device.) Thus to illustrate, if a four page signature is placed in the gage device and a four page signature is taken by the delivery device, the parts of the detector mechanism will be positioned so as to be inoperative with respect to each other, and if the delivery device should fail to take a signature, should take too many signatures, or should take a signature of improper thickness, then one of the members of the detector mechanism will be improperly positioned with respect to the other member and the two members will then fail to properly register and will act to either immediately or intermediately interrupt the action of the machine, or to otherwise give notice of the existence of the abnormal condition. The machine is thus adjusted to signatures of a different thickness by simply inserting in the gage device a signature of the proper size to be handled by the gripper. The gage device is preferably located with relation to the particular hopper and delivery device so that the signature in the gage device will serve as a signal or indicator of the signatures in that particular box. The gage signature, as it may properly be called, thus serves also as a guide to the attendant to assist in placing the signature stacks in their proper boxes or hoppers. The detector mechanism exercises a control over the machine, or at least serves to give notice of any abnormal conditions in the operation of the machine. I prefer, however, to provide a stop mechanism, or stop motion, as it is sometimes known, which is under the control of the detector mechanism and is actuated thereby to interrupt the operation of the machine when the detector becomes operative, due to the presence of any abnormal condition. This stop mechanism may take many different forms, but for this purpose I prefer to use a pneumatic system in which is located a controller member, the controller member being maintained inactive when conditions in the pneumatic system are normal. The pneumatic system may be either a pressure or vacuum system. I prefer, however, to use the vacuum principle and to provide means such as a fan for maintaining the proper vacuum in the system. Certain means are provided for normally maintaining the pneumatic system closed or continuous, and these last named means are actuated by the detector mechanism to break the continuity of the pneumatic system. This means for breaking the continuity of the pneumatic system may then, and preferably would, consist of valves in the pneumatic system, which are opened only when the detector mechanisms are actuated. The controlling means would preferably consist of a cylinder and a piston therein, the piston being maintained in one position by the normal condition of vacuum, or pressure, as the case may be, in the pneumatic system, and a spring or equivalent device acting to move the piston to another position when the normal condition of the system is interrupted or broken. This piston by its action, serves to shift a belt from a tight to a loose pulley, on the driving shaft of the machine, or to operate a switch, or in some other way to control the operation of the machine. It will be evident that this system of pneumatic control may be applied as well to other than signature gathering machines.

In paper which is supposedly of a uniform thickness there is always a certain amount of variation, that is, an inherent variation in the thickness of the paper which it is impossible to overcome by the use of the most approved methods of paper making. This variation is, of course, very slight, and in a single sheet it would be practically negligible, but in a large signature, such as a sixteen page signature, for instance, this inherent variation might make an appreciable difference in the thickness of the signature so that one sixteen page signature might vary in thickness from another sixteen page signature made of the same quality of paper. I have provided means for adjusting the detector mechanism so as to compensate for this inherent variation in the thickness of the paper. This compensating means is preferably applied to the gate member of the detector mechanism, and as preferred, takes the following form: The gate member is made in two parts, the parts being pivoted so as to have a common movement and a movement toward and away from each other. Each of these parts has an extension by means of which it is adjusted and the extension on one part is longer than that on the other part. The movable member or jaw of the gage device is provided with a part which is adapted to contact both the extensions of the gate parts. Thus when a signature is inserted in the gage device, the movable member of the gage device having a common bearing on both the extensions on the two gate parts, imparts a bodily or universal movement to both parts of the gate member. The extensions of the two parts being of different lengths and both the extensions being engaged by the same member, there is a corresponding difference in the movement of the two parts of the gate member, depending upon the difference in leverage of the two extensions. The proportion of the various associated parts is preferably such that when a signature is inserted in the gage device and a signature of the same size is held by the delivery device, one of the gate parts has a movement about 5 per cent. greater than the movement of the trip member (which trip member is positioned by the delivery device) and the other gate part has a movement 5 per cent. less than the movement of the trip member.

It is important to the proper working of the detector mechanism that the gate opening through which the trip member normally passes shall be as small as possible so that the trip member will just pass through the gate opening when the signatures are of proper size, and will engage one of the sides of the gate opening when there is any variation in the thickness of the signatures. There must, however, be allowed a slight clearance for the trip member in its movement through the gate opening, so that the very slight and inconsequential inherent variations in the thickness of the single sheet will not cause the stoppage of the machine. The compensating mechanism provides for this necessary amount of clearance. The thickness of a sheet of paper in the sheet delivery device communicates a movement to the detector finger or trip member directly proportionate to such thickness, while the thickness of a single sheet of paper in the gage device causes movement to be communicated to the two parts of the gate member in different ratios, one of the parts of the gate member being moved about 5 per cent. more than would be proportionate to the single thickness of signature, and the other gate part being moved a distance about 5 per cent. less than would be directly proportionate to the thickness of a single sheet in the gage device. This variance in the movement of the two gate parts is, of course, very slight and only enough to compensate for the inherent variance in the thickness of the paper. When small signatures, as for instance two page signatures, are being handled the variance in the movement of the two gate parts is barely appreciable, but in the handling of comparatively large signatures, a sixteen page one for instance, the variance is appreciable to such an extent that the combined inherent variances in each sheet of the sixteen pages of the signature does not effect the operation of the detector mechanism. It will be evident that when a small signature is handled the clearance for the detector finger is very slight, but when large signatures are being handled, the clearance is greater, and must be so because the inherent variance in a sixteen page signature would amount to more than the inherent variances in a two page signature. This compensating device is preferably used in connection with the self-adjusting feature, but the co-relation of the two parts is not essential, and the compensating feature may or may not be used, as desired.

When there is any imperfection in the signature, the detector finger should fail to register with the gate opening in the gate member and should engage one of the sides of the gate member and impart movement to the gate member. When this variation or imperfection in the signature is slight as when a single sheet is missing out of an eight page signature the detector finger may engage only the bare edge of the gate opening and in such a case there is a tendency of the detector finger to slip without imparting the proper movement to the gate member.

A further object of my invention is to overcome this objectionable tendency to slip and to cause the detector finger, when it fails to register with the gate opening, to positively engage and impart movement to the gate member. This result I accomplish by providing the gate member with a pivoted latch or dog the point of which protrudes slightly, and forms one edge of the gate opening. This dog is provided with a cam-like surface so that when the detector finger fails to truly register with the gate opening it will engage the protruding point of the dog and by reason of the cam surface the dog will be shifted over to close or partially close the gate opening, and a further movement of the detector finger will impart movement to the gate member itself.

In the accompanying drawings are illustrated several preferred embodiments of the invention, but various changes and modifications may be made therein without departing from the scope of the invention. Also while I have described the various features of the invention as associated with and forming a part of a signature gathering machine, still I would have it understood that the various features of the invention are not necessarily limited to this use, and they may be employed wherever practicable.

Figure 1 is a transverse sectional view of a signature gathering machine of a well known type (Patent No. 761,496) with my improvements applied thereto, only one of the signature grippers being shown in this view, and the gripper and associated parts appearing in elevation. Fig. 2 is a detached detail view of the gripper and detector mechanism, showing the gripper in both the seizing and releasing positions. Figs. 3, 4, 5 and 6 are detail views of various types of signature gathering machines, with my improved detector mechanism adapted thereto showing signatures in the act of being calipered. Figs. 3ª and 5ª are plan views of Figs. 3 and 5 respectively. Fig. 7 is a diagrammatical view of the electrical contact means associated with the types of machines shown in Figs. 5 and 6. Fig. 8 is a detached view of a signature gripper with a modified form of a detector mechanism. Fig. 8ª is a broken detail view taken on the line 8—8 of Fig. 8. Fig. 9 is a broken detail view of a slight modification of the detector mechanism illustrated in Fig. 8. Fig. 10 is a detached detail view of a slightly modified construction of one of the detector members, known as the gate member. Fig. 11 is a view partly in elevation and partly in section showing my improved stop mechanism applied to a signature gathering machine, only as much of the machine being shown as is necessary to illustrate the application of the stop mechanism thereto. Fig. 12 is a view of the controlling cylinder forming a part of the stop mechanism, and which actuates the belt-shifting fork or other controlling means. Fig. 13 is a sectional view of the controlling cylinder and the correlated parts. Fig. 14 is a broken detail view of a modified form of gripper jaws.

In the drawings like reference characters apply to similar parts throughout the several views.

The invention will first be described as applied to a signature gathering machine of the type illustrated in my Patent 761,496 of May 31, 1904.

One of the signature hoppers 1, of a signature gathering machine is shown at the right in Fig. 1 and the conveyer appears at the left and is designated 2, the conveyer having the suitably spaced upstanding pins 3, dividing the conveyer into a series of sections which serve as compartments to receive the gathered signatures. The gripper lever 4 is carried by the rock shaft 5 and is oscillated thereby between the signature hopper and the conveyer. The gripper lever has the usual fixed jaw 6 and the pivoted jaw 7. The jaws are opened and closed in the usual manner by means of the connected toggle members 8 and 9, the upper toggle being pivoted to the gripper lever on the center 10 and the link 11 serving to communicate motion from the rocker arm 12 to the toggle members. The rocker arm 12 is carried by rock shaft 13 and this rock shaft is operated at the proper time to open and close the gripper jaws. The means for operating this smaller rock shaft and the larger rock shaft which supports the gripper lever are not shown, as their illustration is unnecessary for the purpose of this disclosure.

The detector mechanism comprises preferably a relatively movable detector arm 14, having an angular lug or finger 15 on the end thereof, which is so positioned as to truly register with a gate opening 16 in the gate member 17, when the signature in the sheet delivery device or gripper, as it is here shown, is of the proper predetermined thickness. The detector finger must therefore save a movement which is related to the movement of the gripper jaws and for this reason the detector arm is preferably carried by the upper toggle member. As a matter of fact it may form an integral part of the toggle member, as illustrated in the drawing. The gate member is pivotally supported on the dependent arm 18, which arm is carried by the signal member 19. The arm 18 is preferably hinged to the lower portion of the signal arm at the point 20, so that it may swing upward and outward in case the detector finger should contact with the inner face of the gate member.

The gage device heretofore referred to is preferably carried by the signal arm and in its preferred form consists of relatively fixed and movable gripper jaws 21 and 22.

movable jaw of the gage device has an angular extension 23, to the end of which is connected a link 24, the lower end of this link in turn being pivoted to the gate member at the point 25. If, now, a signature of the size which it is desired shall be handled by the delivery device is inserted in the jaws of the gage device, the gage jaws will be separated according to the thickness of the signature held therebetween. The angular extension of the movable gage jaw will be deflected upward, carrying with it the link 24, and as this link is pivotally connected to the gate member, the gate member will be swung upward on its pivotal support 26. It will thus be understood that a signature of a certain thickness when inserted in the jaws of the gripper device will cause a proportionate deflection of the gate member. If the signature taken by the sheet delivery device or the gripper jaws as here shown, is of the same thickness as the signature held in the gage jaws, then the detector finger which is controlled by the gripper jaws will be deflected upward to the same extent as was the gate member and the detector finger will then pass through the gate opening in the gate member and the parts will continue in their operation. It will be evident that in order to effect this proportionate movement of the detector finger and gate member, the ratio or leverage between the gripper jaws and the one member of the detector mechanism must be equal, or substantially equal to the ratio between the gage device and the other member of the detector mechanism. This proportionate relation of the levers is best illustrated in Fig. 2, and it will be noted that in this view the lengths A, B, C and D of the levers forming the delivery part of the detector mechanism are equal to the lengths A', B', C' and D' of the levers forming the gage part of the detector mechanism.

The machine is set for signatures of different thicknesses by simply inserting a signature of the desired thickness in the jaws of the gage device. The weight of the gate member serves to hold the jaws of the gage device closed upon the signature and the jaws may be opened to receive a signature by simply lifting up the outer end of the gate member. It will be evident that if a six page signature, for instance, is inserted in the gage device, that the gate member will be deflected a certain distance. Now when the gripper jaws take a six page signature, other things being equal, the detector finger will be deflected a distance equal to the deflection of the gate member, and the detector finger moving back with the signature gripper after the signature has been seized by the same will register with the gate opening in the gate member and will pass through such opening without affecting the gate member. If, however, the gripper jaws should take too many signatures, or should fail to take any signature, or if the signature is greater or less than a six page one, then the deflection of the detector finger will be either greater or less than that of the gate member and the detector finger will then fail to register with the gate opening and will contact with the gate member instead of passing through the gate opening therein. The detector finger and gate member may be initially adjusted with respect to each other, either by means of a turn buckle 27 in the toggle member 8, or by means of the adjustable plates 29 on the gate member which may be adjusted on said member by means of the bolts 30 to change the relation and size of the gate opening. After this initial adjustment has once been made, however, in order to change from one size signature to another, it is only necessary to insert a signature of the desired thickness in the grip of the gage device. The length of the levers which go to make up the detector mechanism may vary as long as the proportionate movement of the two members of the detector device is the same, or substantially the same.

The detector mechanism may simply serve to indicate an abnormal condition, such as the missing of a signature, or the presence of a signature of the wrong size, but I prefer to associate with the detector mechanism means for interrupting the action of the machine when any such abnormal condition exists. This means preferably consists of a pneumatic system made up of a system of piping 31 and a suction device such as a fan 32 for normally maintaining a vacuum in the pneumatic system. Controlling means is associated with this pneumatic system and this controlling means preferably is in the shape of a cylinder 33, in which is mounted a piston 34 carrying the piston rod 35, which actuates a belt shifting fork 36. The cylinder 33 is included in the piping system as shown in Fig. 13 and the vacuum created by the fan or other suction device serves to normally hold the piston at the inner end of its stroke. A spring 37 is arranged to exert its force against the suction applied to the piston, so that as soon as the continuity of the system is broken at any point and the vacuum is relieved, this spring will become active to thrust the piston outward. This outward movement of the piston shifts the fork over and the driving belt 38 is shifted from the tight pulley 39 on to the loose pulley 40, both these pulleys being on the drive shaft 41. Of course a switch or other equivalent controlling device could be substituted for the belt shifting fork. For the purpose of controlling the continuity of the system, a portion of the piping of the pneumatic system preferably extends the full length at the upper part of the machine and at different points this pipe is provided with ports 42. These ports are normally closed by valves 43 on the lower ends of the signal arms, and these valves may be provided with a rubber gasket or packing as shown in the sectional view. The signal ball or weight 44 on the upper end of the signal arm serves to normally hold the valve on the lower end of the arm in engagement with the respective port in the pipe system, and as this is the normal position of the signal arms, the ports are normally closed and the vacuum in the system is complete. If, however, the gripper should miss a signature, or other abnormal conditions in the handling of the signatures should arise, the detector finger will engage the gate member in the manner before described, and by the continued motion of the detector finger the gate member and the signal arm of which it really forms a part, will be rocked over and the valve on the lower end of the signal arm will uncover the corresponding port in the pipe system. This open port will relieve the vacuum in the system and the shifting spring 37 will become active and will throw the fork over, shifting the driving belt onto the loose pulley. In this way an abnormal condition which the machine is capable of detecting will cause the immediate stoppage of the machine. The machine may again be started by remedying the abnormal condition and by rocking the signal arm back to its normal position, so as to close the port in the pipe system.

The detector arm is preferably made of considerable length, so that a slight movement of the gripper jaws will cause a comparatively great movement of the detector finger, but even under these conditions a slight defect in the signature taken by the gripper jaws may cause only a comparatively slight movement of the detector finger. When the defect in the signature is only slight, therefore, the detector finger may engage only the extreme edge of the gate opening, and there would then be a tendency of the finger to slip over the edge and pass on through the gate opening without imparting any motion to the gate member. I provide means for overcoming this tendency to slip when the detector finger engages only the upper edge of the gate opening. This means would preferably take the form of a dog or latch member 46, pivoted on the gate member at point 47, the point of the dog protruding slightly into the gate opening of the member, and in fact constituting one edge of such gate opening (see Fig. 10). The dog has an inclined surface 48 extending inward from the point thereof. A slight deflection from the true path of the detector finger will cause it to engage with this protruding point of the latch member and the detector finger, acting on the inclined surface of the latch member, will cause the latch member to swing over on its pivot and close, or at least partly close the gate opening in the member. After the latch member has thus been swung over to close the gate opening, so as to provide a firm bearing surface for the detector finger or trip member, the further backward movement of the detector finger will impart a swinging movement to the gate member, thereby setting in action the stop motion, signal device, or whatever it may be. The position of the point of the dog may be adjusted with respect to the gate opening by means of a set screw 49 and a pin 50, working in a slot 51 in the dog, or other equivalent device is used to limit the swinging motion of the dog. The point of the dog illustrated, forms the lower boundary of the gate opening and remains in its normal inoperative position by reason of its own weight. If, however, an additional dog were used to form the opposite boundary of the gate opening, a spring or other equivalent device would probably be necessary to hold the said dog up in its normal inoperative position. This modification is such an obvious one that its illustration is considered unnecessary.

The automatic or self-adjusting principle may, of course, be applied to different types of signature gathering or sheet handling machines. Figs. 3 to 6 illustrate this principle as applied to several different types of signature gathering machines.

In the type of machine (known as the Plimpton & Lewis) shown in Fig. 3, the signature passes between the gripper roll 52, and the detector roll 53, which is carried by the angular lever 54, the lever being pivoted at the point 55. The lever has an abutment member usually in the shape of a screw 56 at its opposite end, and this screw or abutment member has a bearing on the detector arm 57. The detector arm is pivotally supported on the stationary bracket 58 and the spring 59 connected between a fixed part and the extended end 60 of the detector arm serves to hold the detector arm up in engagement with the abutment member on the lever 54. A gage device in the form of relatively fixed and pivoted jaws 61 and 62 is provided as before and the gage signature is held in these jaws. The pivoted jaw has a prolongation 63 carrying on its end the gate member 64. The gage device is carried by an arm 65, which is mounted on a rock shaft 66, the rockshaft being journaled in the frame of the machine and oscillated by any suitable means, such as a cam. The action of this machine is as follows: A signature of the proper size is inserted between the jaws of the gage device, the thickness of the signature causing a proportionate deflection of the gate member. When the signature on the gripper roll passes under the detector roll 53, the lever carrying the detector is rocked a corresponding amount and the outer end of the lever is lifted accordingly, thereby allowing the detector finger to rise a certain distance. The arm carrying the gate member and gage device oscillates back and forth and if the signature in the delivery device (which in this case is the gripper roll) is of the same size as that in the gage device, the opening in the gate member registers with the detector finger and the parts continue in operation. If, however, there is a variation in the thickness of the two signatures, or if any other abnormal condition which the machine is capable of detecting exists, then the gate opening will not register with the detector finger and the gate member will engage the detector finger and the further movement of the gate member will be thereby interrupted. The interruption of the movement of the gate member causes the actuation of certain stop mechanism, or otherwise gives notice of the existence of any abnormal condition. (The stop mechanism or signal device is not illustrated.) The oscillatory movement of the gate member is indicated by dotted lines in this figure and it will be understood that any desired form of stop motion or signal mechanism may be associated with the detector mechanism.

In the form (known as the machine of the Dexter Patent No. 588,635) shown in Fig. 4 the delivery device consists of a pair of rollers 67, one of which is movably related with respect to the other. The movable roller may conveniently be carried in a bracket 68 slidably mounted on a support 69. The spring 70 exerts its tension to hold the movable roller in contact with the relatively stationary roller. The movable roller is thus yieldingly mounted so that when the signature passes between the two rollers the movable roller will be moved an amount corresponding to the thickness of the signature. A switch 71 is located in the signature path and is adapted to deflect the signature onto a conveyer or apron 72 when the signatures are of the proper thickness and to deflect the imperfect signatures in the opposite direction or away from the belt or conveyer. The gage device here, as before, consists of a pair of relatively fixed and movable holding members 73 and 74 respectively, between which is inserted the gage signature, and the movable part of the gage device has a prolongation 75 carrying at its end the gate member 76. This gage device is given a reciprocating motion, preferably by mounting it on a reciprocating bar 77, which is slidably supported in brackets 78, the crank 79 serving to communicate the necessary motion to the bar. The other member of the detector mechanism is carried by the lever 80, which is pivoted to the link 81. Connections are interposed between this lever and the movable detector roll, so that the detector member carried by the lever will be positioned according to the thickness of the material between the rolls. These connections preferably consist of a bell crank 82, pivoted on the center 83, the upper arm of the bell crank being engaged and positioned by the dependent portion 84 of the bracket supporting the movable roller and a link 85 is connected between the other arm of the bell crank and the lever 80. The link 85 is preferably provided with a turn buckle, to adjust the position of the detector finger, and the gate member, which is positioned by the gage device, is also preferably adjustable. When the signature passes between the rolls of the delivery device, the movable roll is deflected according to the thickness of the material, thereby causing the bell crank to rock on its center, and by means of the link 85 the detector finger is lowered an amount proportionate to the thickness of the signature in the delivery device. If the signature in the delivery device is of the same thickness as that in the gage device, the gate member and the detector finger will be deflected an equal amount so that the opening in the gate member will register with the detector finger and the reciprocation of the gate member will then have no effect upon the detector finger. If there is any variation in the thickness of the two signatures, the opening in the gate member will not register with the detector finger and the gate member will contact with the detector finger and the movement of the gate member will be imparted to the lever 80, causing the supporting link 81 to rock on the center 86, and the rod 87 connected between the upper end of this link and the switch will cause the switch to be shifted over (to the right in this figure), so as to deflect the defective signatures away from the conveyer. A spring 88, or equivalent device serves to hold the switch normally in position so as to deflect the signatures upon the conveyer.

In the type of machine (known as the Goodman machine, illustrated in Fig. 5 the signature is caused to pass between the delivery rolls 89 and the gage signature is placed in the jaws of the gage device, which in this case consists of a pair of gage rolls 90, one of the gage rolls being relatively stationary in bracket 91, while the other gage roll is carried by the movable jaw 92, which has an angular bell crank extension 93. The upper end of this angular extension 93 is connected by a link 94 to the dependent arm 95 of the bell crank 96. This bell crank 96 is pivoted at the point 97 and is provided with double contact points 98. The lower of the delivery rolls is relatively stationary while the upper roll is carried by the lower end of the angular lever 99, which lever is pivoted on the center 100. The upper end of the lever 99 is connected by link 101 to a bell crank member 102, also pivoted on the center 97, and this bell crank member has a pair of contact points 103, disposed opposite the contact points 98. This pivot center 97 may simply be a shaft, as shown, on which both the parts 96 and 102 are loosely mounted. It will be seen that this last member 102 forms the gate member of the detector mechanism, while the arm carrying the inner contact points 98 forms the detector finger or trip member of the detector mechanism. The contact points 103 are intermittently connected with a source of electricity, at the time a signature should be passing through the delivery rolls. The means for connecting these points with a source of electricity will consist of suitable contact mechanism, such as a rotatable switch member 104 shown in Fig. 7, which is connected with a suitable source of electrical supply 105. The operation of this machine is as follows: A signature of the desired size is placed between the jaws or rolls of the gage device and the contact points of the detector mechanism are given a certain downward deflection. If the signature passing between the delivery rolls is of the same thickness, the gage member is given a corresponding downward deflection. The contact points 103 are adjusted so that when the signature in the gage device and delivery device are of the same thickness the contact points 98 will be just out of engagement with the contact points of the gate member. If, however, there is any variance in the size of the gage signature and the signature passing between the delivery rolls one of the contacts 98 will engage one of the contacts 103 of the gate member, the contact 103 being connected with the electrical source at this moment by means of a switch device such as that shown in Fig. 7. Then when this contact is made the circuit will be complete to cause the actuation of a switch, magnetic clutch, or like device, either to stop the machine or to give notice of the abnormal condition.

The device (known as the Sague machine) illustrated in Fig. 6 is quite similar to that just described. Here the gage signature is placed between the relatively fixed jaw 106 and the relatively movable jaw 107. The movable jaw is pivoted on the center 108 and is provided at its upper end with a gate extension 109, carrying the contact points 110, forming a gate between which the contact points 111 on the lever 112 are adapted to vibrate. The lever 112 is pivoted on the same center 108 and carries at its lower end a delivery roll 113, coöperating with the relatively stationary delivery roll 114. If the signature in the delivery device is of the same thickness as that in the gage device the contact points on the gate member and those on the lever 112 will remain out of contact, while if there is any variance in the size of the two signatures, or if a signature is missed, or too many signatures are taken, the contact points will engage and the circuit will be complete to actuate a clutch or like device. The contact points in this machine are intermittently connected with an electrical source in the same manner as the machine shown in Fig. 5, preferably by means of a switch device like that shown in Fig. 7.

As was stated in the preamble to the specification there is a certain inherent variation in the thickness of all paper. I provide means for compensating for this inherent variation, so that while the machine will be caused to stop or to give indication when there is any variation in the thickness of the signature itself, as when one or more sheets are missing, the machine will not be caused to stop simply on account of this very slight inherent variation in the thickness of the sheets. I accomplish this result preferably by making the gate member in two parts 115 and 116, which are pivoted on the common center 117 carried by the signal arm 18. (See Fig. 8.) The opposing edges 118 of the two plates constitute the gate opening between which the detector finger passes when conditions are normal. Each of the gate parts is provided with an extension 119, serving in the capacity of a lever for moving the gate part, one of said extensions being longer than the other. The gate member may be adjusted either automatically or by hand, as desired. The automatic adjustment is the preferred one, however, and it is illustrated in Fig. 8. Here are shown the relatively fixed and movable gripper jaws 120 and 121 of the gage device, as before, and the movable gage jaw has a cam extension 122, which bears against both the extensions of the two gate parts (the whole gage device is here carried by the signal arm, the same as in Fig. 1). A signature of the desired thickness is placed in the jaws of the gage device and as the cam extension of the movable jaw bears on both the extensions of the two gate parts, both gate parts are moved bodily upward. On account of the difference in the length of the extensions, however, one of the gate parts is moved a greater distance than the other. As has been before explained, the detector finger is deflected a distance directly proportionate to the thickness of the signature in the gripper jaws. The proportion of the extensions or lever arms 119 of the gate parts is preferably such that one gate part will be moved 5% more than the detector finger, while the other gate part is moved a distance 5% less than the detector finger. By means of this construction the gate opening is in reality made slightly larger when thicker signatures are being handled, so as to allow for the combined variations in the greater number of leaves. By reason of this compensating adjustment of the gate parts a certain latitude is allowed the detector finger in its passage through the gate and the detector mechanism will not be rendered active due to any slight inherent variation in the thickness of the paper. A slight modification of this compensating mechanism is illustrated in Fig. 9, wherein the extensions 123 of the two gate parts are shown provided with adjustable abutments or bearing points 124. These adjustable abutments are carried on the bolts or studs 125 and are adapted to be engaged by the cam extension 126 of the movable gage jaws in the same manner as just described. Here by means of these adjustable abutments the two gate parts may be adjusted with respect to each other.

When the gripping surface of the gage jaws is rounded or curved, the surface bearing upon the signature is of comparatively slight area, and there would be a tendency to squeeze the signature and compress it to a certain extent. To overcome this tendency of the jaws to compress the signature, I may make the jaws as shown in Fig. 14. Here one of the jaws has a flat gripping surface 12 , and the other jaw consists of a gripping member 128, having a corresponding flat gripping surface, this gripping member being provided on the end of the jaw member 129. In this way a comparatively large gripping surface is provided so that the signature is firmly held in the grip of the jaws without squeezing or compressing the same.

I do not wish to confine myself to the precise construction and relation of the parts shown and it will be understood that the various features of the invention may be employed wherever practicable.

What is claimed, is:

1. The combination with two signature calipering devices, of mechanism controlled by said devices for detecting a difference in the thickness of the signatures held in the two devices.

2. The combination with signature calipering devices, of mechanism for detecting any difference in the thickness of the signatures in the signature calipering devices, and connections between the signature calipering devices and detector mechanism.

3. The combination with a signature holding device, a signature handling device, and means for operating the signature handling device, of detector mechanism controlled by the signature holding and handling devices, and connections from the detector mechanism whereby the operating means will be rendered inoperative when the signatures in the holding device and the handling device differ in thickness.

4. Detector mechanism comprising two detector members movably related to each other, and operating normally free of each other, two members adapted each to receive and caliper a thickness of material, and connections from the holding members whereby the detector members will remain free of each other when the thickness of the material held by the two members is the same, and will be brought into operative engagement with each other when the thickness of the material in the two holding members is different.

5. The combination with a sheet handling device, of means for detecting any variation from a predetermined thickness in the thickness of the sheets handled by the sheet handling device, and holding means adapted to receive a sheet of the proper thickness and connected with the detector means to adjust the detector means to sheets of different predetermined thicknesses.

6. The combination with a sheet delivery device, of detector mechanism associated therewith, and calipering means adapted to receive a sheet of the proper thickness and connected with the detector mechanism for adjusting the detector mechanism to sheets of different thickness.

7. The combination with a signature delivery device and means for operating the same, of detector mechanism associated with the signature delivery device adapted to detect any variation in the thickness of the signatures handled by the delivery device from a predetermined thickness, and means adapted to receive a signature of the predetermined thickness, and adapted thereby to adjust the detector mechanism to detect variations from such predetermined thickness.

8. The combination with a signature delivery device and means for operating the same, of detector mechanism associated with the signature delivery device adapted to detect any variation in the thickness of the signatures handled by the delivery device from a predetermined thickness, means adapted to receive a signature of the predetermined thickness and adapted thereby to adjust the detector mechanism to detect variations from such predetermined thickness, and connections from the detector mechanism for rendering the operating means inoperative when there is any variation in the thickness of the signatures handled by the delivery device.

9. In combination with a detector mechanism comprising two related parts, a signature delivery device, a signature holding device, and connections from the signature delivery and the signature holding devices to the two related parts of the detector mechanism whereby said parts will be properly related when the signatures in the delivery and holding devices are of the same thickness.

10. The combination with a signature delivery device and means for operating the same, of means for holding and calipering a signature, detector mechanism comprising members relatively stationary and movable with respect to each other under normal conditions and normally operating free of each other, connections from the delivery device and holding means for positioning the relatively movable and stationary members of the detector mechanism so that when the signatures in the delivery device and the holding means are of the same thickness the parts of the detector mechanism will be positioned to remain free of each other.

11. The combination with a signature delivery device and means for operating the same, of means for holding and calipering a signature, detector mechanism comprising members relatively stationary and movable with respect to each other under normal conditions and normally operating free of each other, connections from the delivery device and holding means for positioning the relatively movable and stationary parts of the detector mechanism so that when the signatures in the delivery device and the holding means are of the same thickness the parts of the detector mechanism will be properly positioned with respect to each other, the detector mechanism acting when the signatures in the delivery device and holding means differ in thickness, to render the operating means for the delivery device inoperative.

12. A signature handling device and means for operating the same, detector mechanism exercising a control over the operating means and comprising two relatively movable parts which under normal conditions when properly positioned with respect to each other are free of each other, a signature holding device, and connections from the signature handling and signature holding devices adapted when the signatures in the two devices are of the same thickness to properly position the parts of the detector mechanism to be free of each other, and when the said signatures differ in thickness, to position the parts of the detector mechanism to engage each other, and the detector mechanism adapted when the signatures differ in thickness to interrupt the operation of the operating means.

13. In combination with a gripper and means for actuating the same, mechanism adapted to detect any variation from a predetermined thickness of material handled by the gripper, and means adapted to receive a thickness of material and to thereby adapt the detector mechanism to detect any variation from such thickness of material handled by the gripper.

14. The combination with a pair of grippers for holding material, of detector mechanism adapted to control the operation of the machine and normally operative for that purpose, and connections from the grippers to the detector mechanism whereby the detector mechanism will remain inoperative when the thickness of material in both the grippers is the same.

15. The combination with a pair of signature grippers, and means for actuating one of the grippers to cause the same to deliver signatures, of detector mechanism under control of the grippers, adapted to control the operation of the machine and normally inoperative to control the operation of the machine when the thickness of material in both the grippers is the same, but rendered operative when the thickness of signatures in the two grippers is different.

16. The combination with a pair of signature grippers, and means for actuating one of the grippers to cause the same to deliver signatures, of detector mechanism under control of the grippers, normally inoperative when the thickness of material in both the grippers is the same, but rendered operative when the thickness of signature in the two grippers is different, the detector mechanism when thus operative, adapted to interrupt the operation of the actuating means.

17. In combination with a signature gripper for handling sheets or signatures and means for operating the same, detector mechanism comprising a gate member provided with a gate opening and a detector member adapted to pass through the gate opening when the signatures handled by the gripper are of a certain predetermined thickness, and means adapted to receive a signature and to thereby adjust one of the members of the detector mechanism so that said mechanism will detect any variation in the thickness of the signatures handled by the gripper from the predetermined thickness.

18. In combination with a signature gripper, and detector mechanism associated therewith, a gage device adapted to receive a signature and connected with the detector mechanism to adjust the detector mechanism to detect any variation in the thickness of the signature handled by the gripper from the thickness of the signature in the gage device.

19. In combination with a signature gripper, detector mechanism comprising two relatively movable members, a gage device adapted to receive a thickness of material and connections between the gripper, the gage device and the two parts of the detector mechanism, adapted to adjust the detector mechanism according to the thickness of material in the gage device.

20. The combination with gripper jaws, and means for operating the same, of detector mechanism associated with the gripper jaws adapted to detect any variation in the thickness of the material handled by the gripper jaws from a predetermined thickness, and a gage device adapted to receive the predetermined thickness of material and to thereby adjust the detector mechanism for such predetermined thickness.

21. The combination with gripper jaws, and means for operating the same, of detector mechanism associated with the gripper jaws for detecting any variation from a predetermined thickness of material to be handled by the gripper jaws, of a gage device adapted to receive material of a thickness to be handled by the gripper jaws, adapted to adjust the detector mechanism to such thickness of material, the detector mechanism adapted when a variation in the thickness of the material occurs to interrupt the action of the operating means.

22. In combination with gripper jaws, detector mechanism comprising two relatively movable parts which under normal conditions are free of each other, connections from the gripper jaws for positioning one of the parts of the detector mechanism, a gage device and connections therefrom for positioning the other of the members of the detector mechanism.

23. In a signature gathering machine, the combination with a signature gripper, of a gage device adapted to receive a signature of the thickness to be handled by the gripper, a detector mechanism comprising a relatively movable gate member, and a detector finger, and connections from the gripper jaws and the gage device to the detector finger and gate member, whereby the detector finger will pass free of the gate member when the signature in the gripper is of the same thickness as that in the gage device.

24. In a signature gathering machine, the combination with a signature gripper and operating means therefor, of a gage device adapted to receive a signature of the thickness to be handled by the gripper, a detector mechanism comprising a relatively movable gate member, and a detector finger, and connections from the gripper jaws and the gage device to the detector finger and gate member, whereby the detector finger will pass free of the gate member when the signature in the gripper is of the same thickness as that in the gage device, the detector finger adapted to engage the gate member to render the detector mechanism operative to interrupt the operation of the operating means when the signatures in the gripper jaws and gage device differ in thickness.

25. In combination with detector mechanism comprising a gate member and a relatively movable detector finger, gripper jaws and connections therefrom for positioning the detector finger, a gage member and connections therefrom for positioning the gate member, the same thickness of material in the gage member and gripper jaws serving to position the parts of the detector mechanism so that the detector finger will pass free of the gate member, and any variation in thickness of the signatures in the gripper jaws and gage device acting to position the parts to cause the detector finger to engage the gate member, and said detector mechanism then acting to interrupt the operation of the gripper jaws.

26. In a signature gathering machine, gripper jaws and means for operating the same, a gage device adapted to receive a signature, a gate member and a detector finger, connections from the gripper jaws and the gage device whereby the detector finger will pass through the gate member when the signatures in the gripper jaws and gage device are of the same thickness, and will engage the gate member when the signatures differ in thickness, and stop mechanism adapted to be actuated by the detector mechanism when the signatures vary in size.

27. Detector mechanism comprising a member having a gate therein, a detector finger adapted under certain conditions to pass freely through said gate, and a stop member on the gate member adapted to be engaged by the detector finger when said finger fails to properly register with the gate to be moved by said detector finger to close the gate opening.

28. Detector mechanism comprising a member having a gate therein, a finger adapted to normally register with the said gate, and a movable part on the gate member adapted to constitute a bearing for the finger when said finger fails to register with the gate and adapted to be moved with respect to the gate member, when contacted by the finger.

29. The combination with a member having a gate opening therein, of a movable part carried by said member forming one of the edges of the gate opening, and a finger adapted when properly positioned to pass freely through said gate opening and when improperly positioned to engage the movable part aforesaid and move said part to close the gate opening.

30. The combination in a detector, of a gate member having an opening, a detector finger, means for moving the detector finger to cause the same to normally pass through said opening, a member pivoted to the gate member adapted under certain conditions to be contacted by the finger when the finger fails to properly register with the gate opening and adapted to be moved by reason of such contact so as to constitute a closure to the gate opening.

31. The combination with a relatively stationary member having a gate opening, of a movable part carried by said member provided with an inclined contact surface, the part when engaged on said contact surface adapted to be moved to close the gate opening and a detector member adapted under certain conditions to engage said inclined contact surface of the movable part, and means for reciprocating the detector member to normally carry said member through the gate opening.

32. Detector mechanism comprising a member having a gate opening therein, a part movably mounted on said member adjacent the edge of the gate opening therein to constitute one edge of such gate opening, means for adjusting the said part with reference to the gate opening, a movable member adapted to normally pass through the gate opening and under certain conditions to engage with the movable part forming one of the walls of the gate opening, means for operating the movable member, and means for variably positioning the movable member with respect to the gate opening.

33. The combination with a member having a gate opening, of a dog pivoted on said member and constituting one edge of the gate opening, a detector finger, means for moving the detector finger through the gate opening, and means for controlling the position of the detector finger with reference to the dog, the dog when engaged by the detector finger, adapted to be moved to close the gate opening.

34. In combination, a movable but normally stationary member having a gate-opening therein, a detector finger adapted when properly positioned to normally pass through said gate opening, means for moving the detector finger, means controlling the position of the detector finger with reference to the gate opening, and a movable part on the gate member adapted when engaged by the finger to be moved thereby to provide a contact surface for the finger, the further movement of the finger imparting movement to the gate member.

35. In a signature gathering machine, the combination with grippers for handling the signatures and detector mechanism for detecting any difference from a predetermined thickness of signature handled by the grippers, of means for adjusting the detector mechanism to signatures of different thickness, said means adapted to automatically compensate for the inherent variation in the thickness of the sheets in the signatures.

36. The combination with adjustable detector mechanism for detecting variation from a predetermined thickness of material, of a gage device adapted to receive a standard article, and connections from the gage device adapted to adjust the detector mechanism according to the thickness of the article in the gage device.

37. In a signature gathering machine, the combination with adjustable means for detecting variations from a predetermined thickness of material, of means for automatically adjusting the detector means to compensate for inherent variations in the thickness of material.

38. The combination with detector mechanism adapted to detect any variation from a predetermined thickness of signature, and means for adjusting the detector mechanism to signatures of different thickness, of means for automatically adjusting said detector mechanism to compensate for inherent variations in the thickness of the several sheets constituting the signature.

39. In a signature gathering machine the combination with a gate member provided with an opening and a trip member adapted to normally pass through the gate opening, means for moving said trip member, a movable part on the gate member, the trip member being adapted under certain conditions to engage the movable part and move said part to close the gate opening and the further movement of the trip member then serving to move the gate member.

40. In a signature gathering machine, the combination with a signature gripper and means for actuating the same, of a gage device adapted to receive and hold a signature, a gate member having connection with and adapted to be positioned by the gage device, a movable trip member adapted to be positioned by the gripper so that it will not engage the gate member when the thickness of signatures in the gage device and gripper is the same, the trip member being so positioned when the signatures in the gripper and gage device differ in thickness as to engage the gate member, and stop mechanism adapted to be actuated by the gate member when the gate member is engaged by the trip member.

41. In combination with a signature-gathering machine, detector mechanism comprising a member having two pivoted and relatively adjustable parts, forming a gateway and having each a lever arm, means engaging the said two lever arms to adjust the gateway between the members, a trip member adapted for passage through the gateway, and means for normally moving the trip member through the gateway.

42. In a signature gathering machine, the combination with a signature gripper and means for operating said gripper, a signature holding device, detector mechanism, connections from the gripper and signature holding device to the detector mechanism, and connections from the detector mechanism to the gripper operating means whereby the said operating means will be rendered inoperative when the signatures in the gripper and in the holding device differ in thickness.

43. In a signature gathering machine, the combination with two signature holding devices, of mechanism controlled by said holding devices for detecting a difference in the thickness of the signatures held in the two holding devices, and stop mechanism for interrupting the operation of the machine under the control of the detecting mechanism.

44. In a signature gathering machine, detector mechanism comprising members adjustable with respect to each other to provide a gate opening therebetween, a detector finger for passage through the said gate opening, means for positioning the gate members to adjust the gate opening with respect to the detector finger for handling different thicknesses of signatures, and means for proportionately increasing the size of the gate opening when adjusting the gate members for signatures of larger size.

45. In a signature gathering machine, a signature handling device and detector mechanism associated with the same comprising a movable detector finger, members relatively adjustable to provide a gate opening therein for the passage of the detector finger, means for adjusting said members with respect to the detector finger for handling signatures of different thicknesses, and means for increasing the size of the gate opening in proportion to the thickness of signatures to be handled.

46. In a signature gathering machine, a gage device adapted to hold a standard signature, a signature handling device, a detector finger positioned according to the thickness of the signature in the handling device, a gate member comprising two relatively adjustable parts spaced to provide a gate opening therebetween for the passage of the detector finger, and connections from the gage device for variably positioning the gate parts with respect to each other according to the thickness of signature held in the gage device.

47. In a signature gathering machine, a gage device adapted to hold a standard signature, a signature handling device, a detector finger positioned according to the thickness of the signature in the handling device, a gate member comprising two relatively adjustable parts spaced to provide a gate opening therebetween for the passage of the detector finger, the said gate parts having lever arms of different lengths, and a positioning lever engaging the lever arms of the gate parts and positioned according to the thickness of signature held in the gage device.

48. In a signature gathering machine, a plurality of signature hoppers, a gripper associated with each of said hoppers, detector mechanism for each of the grippers, and a gage device adapted to receive and hold a standard signature operatively connected with the detector mechanism of each gripper.

49. In a signature-gathering machine, the combination with the signature-hoppers, and grippers for withdrawing the signatures from such hoppers, of detector-mechanism arranged to detect a variation in the thickness of material taken by the grippers from a standard thickness, and means for automatically adjusting said detector mechanism to detect variations from different predetermined thicknesses of material.

50. In a signature gathering machine, the combination with a signature gripper, and detector mechanism having connection with the gripper so as to detect variations in the thickness of signatures taken by the gripper from a standard thickness, and automatically operated means for adjusting the parts to operate upon different standard thicknesses of material.

Signed in the borough of Manhattan, city of New York, in the county of New York and State of New York this 16th day of February A. D. 1909.

CHARLES A. JUENGST.

Witnesses:
PHILIP S. McLEAN,
CHAS. BEHRMAN.